(12) United States Patent
Ono et al.

(10) Patent No.: US 7,352,425 B2
(45) Date of Patent: Apr. 1, 2008

(54) LIQUID CRYSTAL DISPLAY DEVICE

(75) Inventors: Kikuo Ono, Mobara (JP); Ikuko Mori, Chiba (JP); Ryutaro Oke, Mobara (JP); Hiroyuki Yarita, Mobara (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 656 days.

(21) Appl. No.: 10/991,380

(22) Filed: Nov. 19, 2004

(65) Prior Publication Data

US 2005/0105034 A1 May 19, 2005

(30) Foreign Application Priority Data

Nov. 19, 2003 (JP) .............................. 2003-389024

(51) Int. Cl.
*G02F 1/1343* (2006.01)
(52) U.S. Cl. ........................................ 349/141; 349/142
(58) Field of Classification Search ......... 349/141–142
See application file for complete search history.

(56) References Cited

U.S. PATENT DOCUMENTS

| | | | |
|---|---|---|---|
| 5,914,762 A | 6/1999 | Lee et al. | |
| 6,233,034 B1 | 5/2001 | Lee et al. | |
| 6,256,081 B1 | 7/2001 | Lee et al. | |
| 6,456,351 B1 | 9/2002 | Kim et al. | |
| 6,640,385 B2 * | 11/2003 | Oh et al. | ....................... 15/352 |
| 6,654,092 B2 * | 11/2003 | Yanagawa et al. | .......... 349/141 |

* cited by examiner

*Primary Examiner*—David Nelms
*Assistant Examiner*—Phu Vu
(74) *Attorney, Agent, or Firm*—Antonelli, Terry, Stout & Kraus, LLP.

(57) ABSTRACT

In a liquid crystal display device including a pair of substrates which face each other with a liquid crystal layer disposed therebetween, a plurality of pixel regions which are formed on one substrate, a planar counter electrode which is formed on each pixel region, and a comb-shaped or slit-shaped pixel electrode which is formed on each pixel region, the comb-shaped or slit-shaped pixel electrode being formed over the counter electrode by way of an insulation layer, a notch or a slit is formed in the counter electrode such that a wiring layer made of an opaque material which transmits a potential to the pixel electrode from a thin film transistor defines a region where the wiring layer is not overlapped relative to the counter electrode.

20 Claims, 11 Drawing Sheets

LIQUID CRYSTAL DISPLAY DEVICE

BACKGROUND OF THE INVENTION

The present invention relates in general to a liquid crystal display device, and, more particularly, the invention relates to a liquid crystal display device in which pixel electrodes and counter electrodes are formed on a liquid-crystal-surface side of one substrate of respective substrates which are arranged to face each other with liquid crystal disposed therebetween.

Recently, consideration has been given to a liquid crystal display device having a constitution in which a counter electrode, which is formed as a transparent electrode, is formed over the whole area of a pixel region, except for a periphery of the pixel region, and strip-like pixel electrodes formed as transparent electrodes, which extend in one direction and are arranged in parallel in a direction which intersects the one direction, are formed over the counter electrode by way of an insulation film.

Such a liquid crystal display device is disclosed in Japanese Unexamined Patent Publication Hei 11(1999)-202356 and the corresponding U.S. Pat. No. 6,233,034.

SUMMARY OF THE INVENTION

However, in such a liquid crystal display device, the counter electrode, which is formed in a region other than the slight periphery of the pixel region, is overlapped relative to the comb-shaped pixel electrode formed by way of the insulation film with a large overlapped area. Accordingly, when pin holes are formed in the insulation film, a short-circuiting failure occurs, and this becomes a point defect on a display, whereby the quality of the image is lowered.

Further, in the above-mentioned pixel region, the pixel electrode and a thin film transistor to be connected with the pixel electrode are arranged on different insulation films by way of respective insulation films; and, hence, contact holes having large areas become necessary at connecting portions, thus giving rise to a drawback in that the numerical aperture, that is, the transmissivity of the liquid crystal display device, is lowered. Further, in adopting a constitution in which a signal is supplied to respective counter electrodes using counter electrode lines which are formed of an opaque metal material having a small electrical resistivity, when the width of the counter electrode lines is large, there arises a drawback in that the transmissivity is lowered in the same manner.

Further, portions where the above-mentioned contact holes are formed increase the stepped portions thereof; and, hence, when an orientation film is formed over the portions and rubbing is applied to the orientation film, a region in which the liquid crystal orientation is disturbed substantially along the rubbing direction is formed, thus giving rise to a drawback in that the transmissivity is lowered.

The present invention has been made in view of such circumstances, and it is an object of the present invention to provide a liquid crystal display device in which short circuiting between a pixel electrode and a counter electrode can be obviated, thus enhancing the image quality.

Further, it is another object of the present invention to provide a liquid crystal display device in which the numerical aperture is enhanced.

Still further, it is another object of the present invention to provide a liquid crystal display device in which disturbance of the liquid crystal orientation around peripheries of contact holes can be obviated.

Representative examples of the present invention disclosed in this specification are as follows.

(1) A liquid crystal display device according to the present invention includes a pair of substrates which are arranged to face each other with liquid crystal disposed therebetween, a plurality of pixel regions which are formed on a liquid-crystal-side surface of the substrate, a pixel electrode which is formed in each pixel region and to which a video signal is supplied through a switching element driven in response to a signal from a gate signal line, and a counter electrode which is formed in each pixel region, is connected with a counter voltage signal line and generates an electric field between the pixel electrode and the counter electrode, wherein the counter electrode has a. planer-like shape in the pixel region, a wiring layer which connects the switching element and the pixel electrode and extends into the region where the counter electrode is formed, the pixel electrode is formed on an upper surface of a insulation film which is formed such that the insulation film also covers the switching element and the wiring layer, and strip-like electrodes or slits are formed in parallel in the direction which intersects the extending direction of the strip-like electrodes or slits, and the connection between the wiring layer and the pixel electrode is established through a through hole formed in the second insulation film and the slits which obviate the counter electrode from being overlapped to the wiring layer are formed in the counter electrode.

(2) The liquid crystal display device according to the present invention is, for example, on the premise of the constitution (1), characterized in that the counter voltage signal line is arranged to traverse the pixel region, and a through hole which connects the wiring layer and the pixel electrode is positioned above the counter voltage signal line.

(3) The liquid crystal display device according to the present invention is, for example, on the premise of the constitution (1), characterized in that the initial orientation direction of the liquid crystal is parallel to the gate signal line.

(4) The liquid crystal display device according to the present invention is, for example, on the premise of the constitution (2), characterized in that the initial orientation direction of the liquid crystal is parallel to the counter voltage signal line.

(5) The liquid crystal display device according to the present invention is, for example, on the premise of the constitution (3), characterized in that the extending direction of the strip-like electrodes or slits in the pixel electrode is at an angle of 3 to 20 degrees with respect to the gate signal line in the clockwise direction or an angle of 3 to 20 degrees with respect to the gate signal line in the counter-clockwise direction.

(6) A liquid crystal display device according to the present invention includes, for example, a pair of substrates which face each other with a liquid crystal layer disposed therebetween, a plurality of pixel regions which are formed on one substrate, a planar counter electrode which is formed on each pixel region, and a comb-shaped or slit-shaped pixel electrode which is formed on each pixel region, the comb-shaped or slit-shaped pixel electrode being formed over the counter electrode by way of an insulation layer, wherein a notch or a slit is formed in the counter electrode such that a wiring layer made of an opaque material which transmits a potential to the pixel electrode from a thin film transistor defines a region where the wiring layer is not overlapped to the counter electrode.

(7) The liquid crystal display device according to the present invention is, for example, on the premise of the constitution (6), characterized in that the counter electrode is a transparent electrode.

(8) The liquid crystal display device according to the present invention is, for example, on the premise of the constitution (7), characterized in that the pixel electrode is a transparent electrode.

(9) The liquid crystal display device according to the present invention is, for example, on the premise of the constitution (8), characterized in that the wiring layer and the pixel electrode are connected with each other via a through hole formed in the insulation film which covers the wiring layer.

(10) The liquid crystal display device according to the present invention is, for example, on the premise of the constitution (9), characterized in that the liquid crystal display device includes a counter voltage signal line which is connected with the counter electrode, the counter voltage signal line is arranged to traverse the pixel region, and a through hole which connects the wiring layer and the pixel electrode is positioned above the counter voltage signal line.

(11) The liquid crystal display device according to the present invention is, for example, on the premise of the constitution (6), characterized in that the initial orientation direction of the liquid crystal is parallel to the gate signal line.

(12) The liquid crystal display device according to the present invention is, for example, on the premise of the constitution (10), characterized in that the initial orientation direction of the liquid crystal is parallel to the counter voltage signal line.

(13) A liquid crystal display device according to the present invention includes, for example, a pair of substrates which face each other with a liquid crystal layer disposed therebetween, a plurality of pixel regions which are formed on one substrate, a planar counter electrode which is formed on each pixel region, and a comb-shaped or slit-shaped pixel electrode which is formed on each pixel region, the comb-shaped or slit-shaped pixel electrode being formed over the counter electrode by way of an insulation layer, wherein the planar counter electrode has a removal region at a portion thereof, and the removal region extends in a direction which is different from the extending direction of the comb teeth or the slits of the pixel electrode.

(14) The liquid crystal display device according to the present invention is, for example, on the premise of the constitution (13), characterized in that the removal region extends in a direction parallel to a long side of the counter electrode.

(15) The liquid crystal display device according to the present invention is, for example, on the premise of the constitution (13), characterized in that a wiring layer which is different from both of counter electrode and the pixel electrode is arranged in the removal region.

(16) The liquid crystal display device according to the present invention is, for example, on the premise of the constitution (14), characterized in that a wiring layer which is different from both of counter electrode and the pixel electrode is arranged in the removal region.

(17) The liquid crystal display device according to the present invention is, for example, on the premise of the constitution (16), characterized in that the counter electrode is formed of a transparent electrode.

(18) The liquid crystal display device according to the present invention is, for example, on the premise of the constitution (17), characterized in that the pixel electrode is formed of a transparent electrode.

(19) The liquid crystal display device according to the present invention is, for example, on the premise of the constitution (18), characterized in that the wiring layer and the pixel electrode are connected with each other via a through hole formed in an insulation film which covers the wiring layer.

(20) The liquid crystal display device according to the present invention is, for example, on the premise of the constitution (19), characterized in that the initial orientation direction of the liquid crystal is parallel to a short-side direction of the counter electrode.

DETAILED DESCRIPTION

Preferred embodiments of the liquid crystal display device of the present invention will be explained hereinafter in conjunction with the drawings.

EMBODIMENT 1

Figure 2:
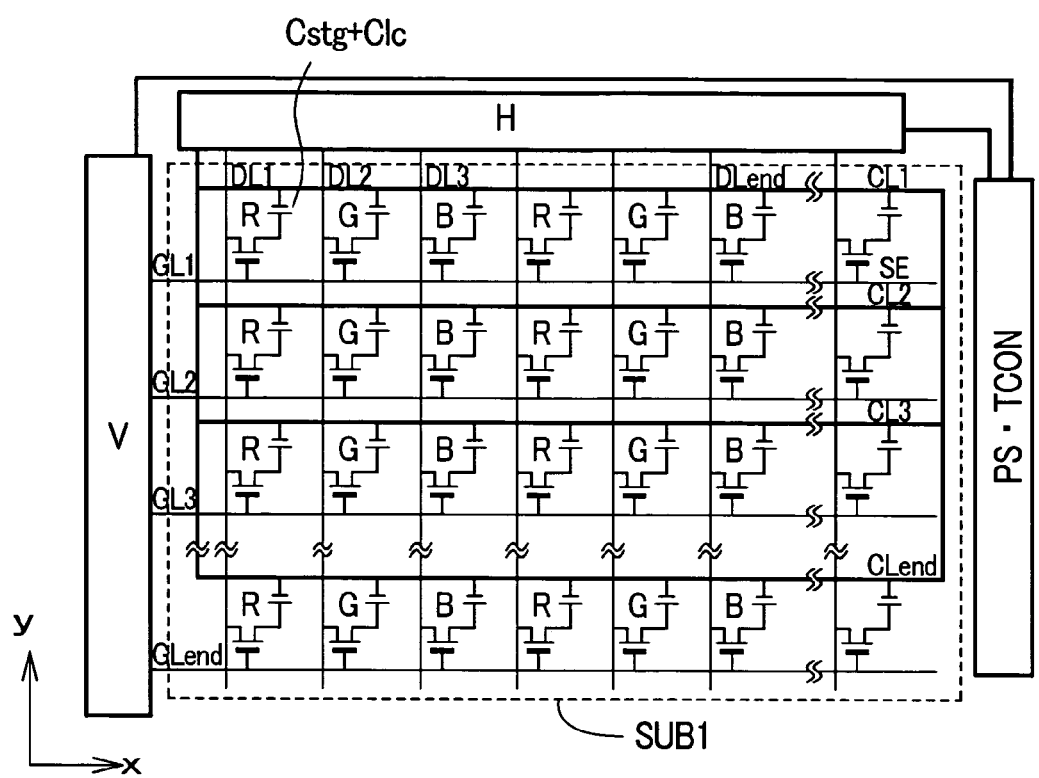
FIG. 2 is an equivalent circuit diagram showing one embodiment of the liquid crystal display device according to the present invention.

FIG. 2 shows an equivalent circuit of a liquid crystal display panel representing one embodiment of the present invention, together with an externally mounted circuit of the liquid crystal display panel.

In FIG. 2, to respective gate signal lines GL, which extend in the x direction and are arranged in parallel in the y direction, a scanning signal (a voltage signal) is sequentially supplied by a vertical scanning circuit V.

A thin film transistor TFT of each one of the pixel regions, which are arranged along the gate signal lines GL to which the scanning signal is supplied, is turned on in response to the scanning signal.

Then, in conformity with this timing, a video signal is supplied to the respective drain signal lines DL from a video signal drive circuit H. The respective drain signal lines DL, as seen in the drawing, extend in the y direction and are arranged in parallel in the x direction. The video signal is applied to respective pixel electrodes PX through the thin film transistors of the respective pixel regions.

Further, a power source is supplied to the vertical scanning circuit V and the video signal drive circuit H from a power source supply PS, while a control signal is supplied to the vertical scanning circuit V and the video signal drive circuit H from a controller TCON.

In each pixel region, a counter voltage is supplied to a counter electrode CT which is formed together with the pixel electrode PX through a counter voltage signal line CL, and an electric field is generated between the respective electrodes. With respect to the pixel electrode PX and the counter electrode CT, at the timing at which an ON voltage is applied to the gate signal lines GL, the thin film transistor TFT is turned on and the video information voltage from the drain signal line DL is applied to the pixel electrode PX, while the counter voltage signal is transmitted to the counter electrode CT in each pixel region through the counter voltage signal line CL, which is connected with the external power source, and, hence, the voltage is applied to the liquid crystal capacitance. The above-mentioned pixel electrodes PX and the counter electrodes CT are formed on a first transparent substrate SUB1 on which the thin film transistors TFT are formed. The pixel electrode PX and the counter electrode CT form a pixel capacitance which is a sum of a holding capacitive element Cstg, which is produced by sandwiching an insulation film between the pixel electrode PX and the counter electrode CT, and a liquid crystal capacitance Clc, which is provided by allowing an electric field between the pixel electrode PX and the counter electrode CT to pass through a liquid crystal portion. The liquid crystal mode of the present invention is characterized in that the area in which the counter electrode CT and the pixel electrode PX are stacked with an insulation film sandwiched therebetween is large, and, hence, the holding capacitance element Cstg of one pixel assumes a large value.

Then, among these electric fields, in response to an electric field having components parallel to the transparent substrate SUB1, the optical transmissivity of the liquid crystal LC is controlled.

Here, as seen in the drawing, respective symbols R, G, B in the respective pixel regions indicate that a red color filter, a green color filter and a blue color filter are respectively formed in the respective pixel regions.

In the above-mentioned structure, one pixel region is a region which is surrounded by neighboring drain signal lines DL and neighboring gate signal lines GL, and, as mentioned above, the thin film transistor TFT, the pixel electrode PX and the counter electrode CT are formed on the region.

On the other hand, the counter voltage signal lines CL constitute lines extending in the lateral direction which are formed on the first transparent substrate SUB1 and are arranged parallel to the gate signal line GL and are collected outside the pixel region where they are connected with an external power source.

Figure 1:
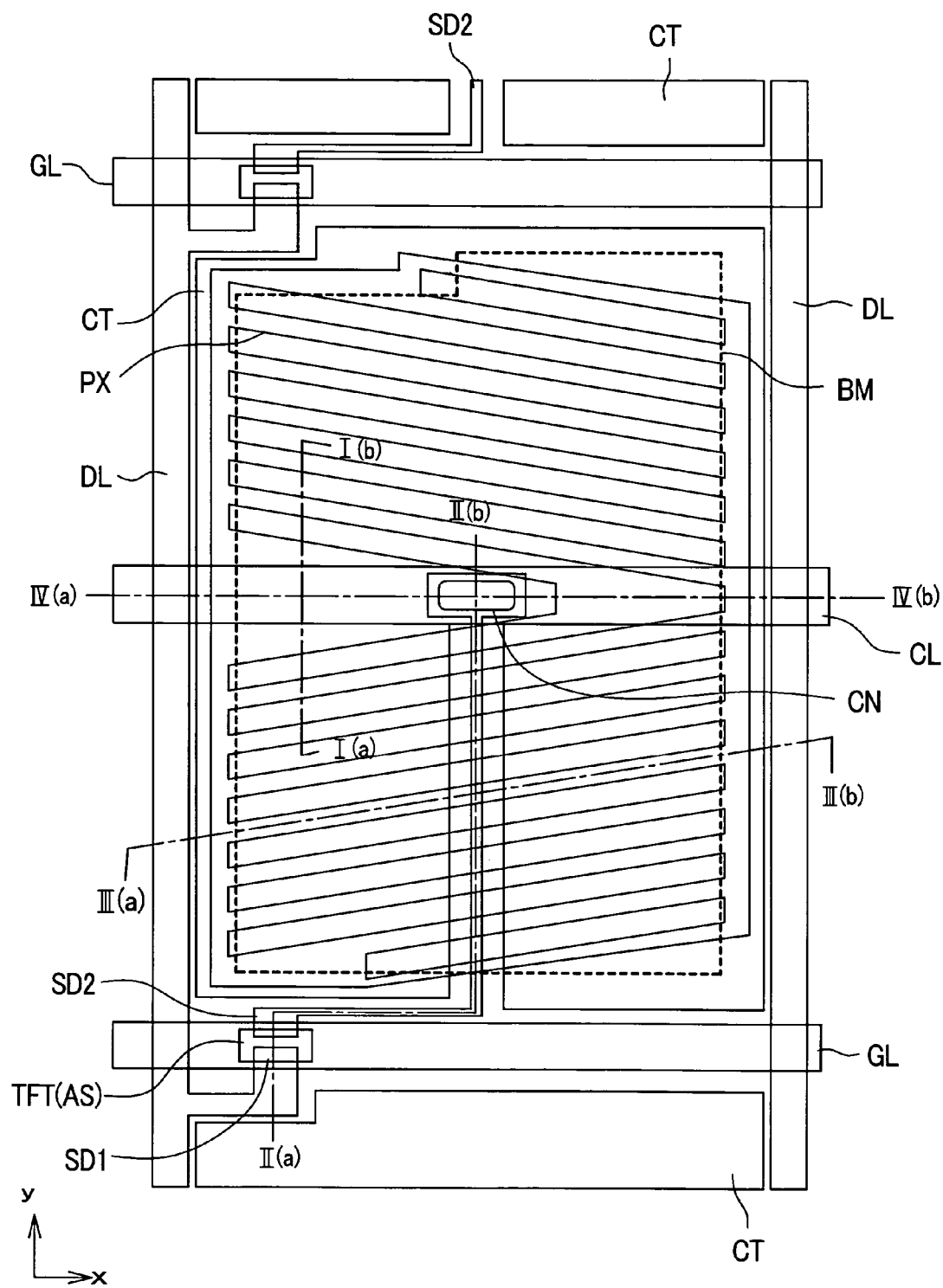
FIG. 1 is a plan view showing one embodiment of a pixel region of a liquid crystal display device according to the present invention.

FIG. 1 shows a pixel region of the liquid crystal display device (panel) according to the present invention, and it is a plan view of one transparent substrate of respective transparent substrates which are arranged to face each other with liquid crystal disposed therebetween, as viewed from a liquid crystal side of the transparent substrate.

Figure 3:
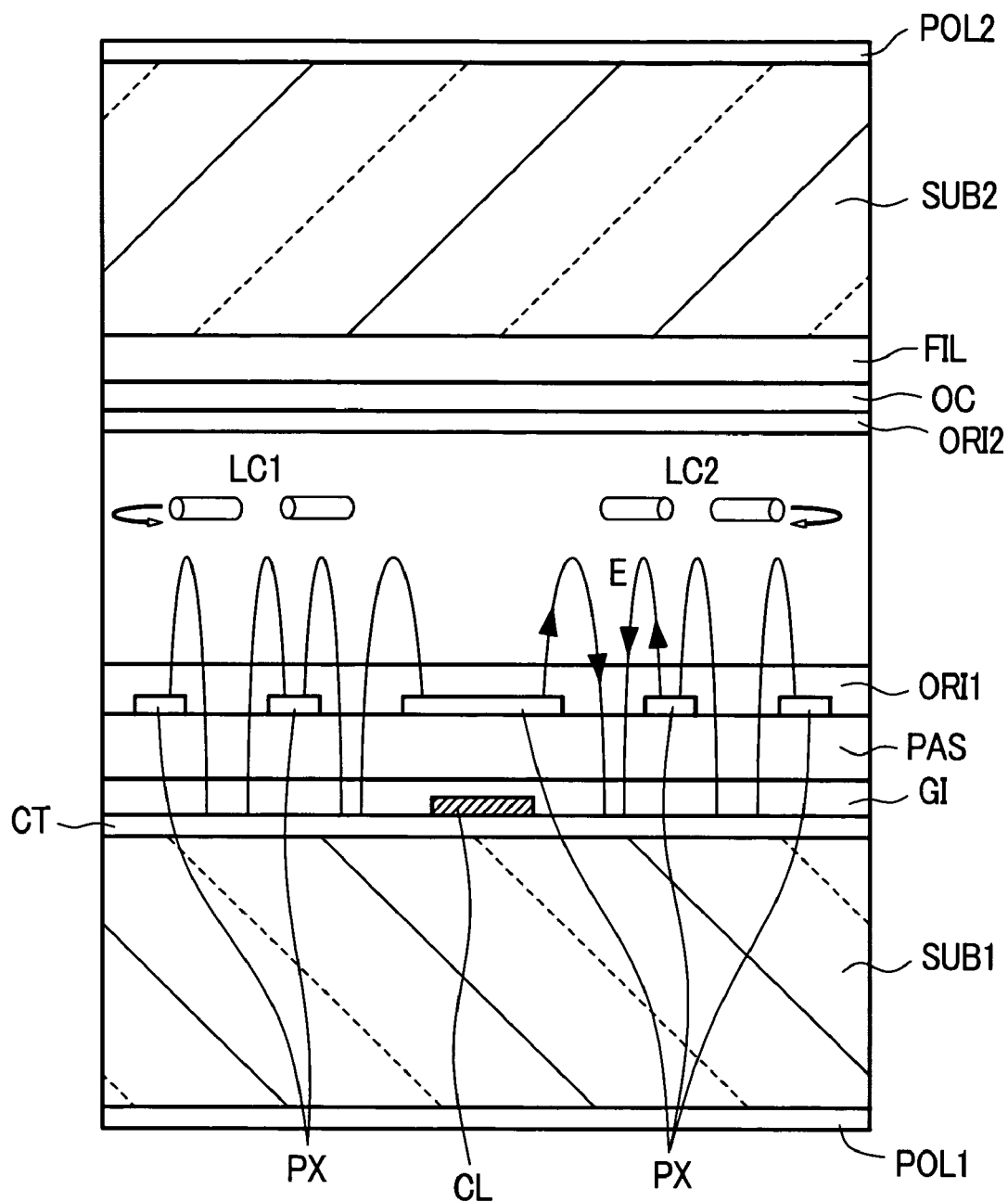
FIG. 3 is a cross-sectional view taken along a line I(a)-I(b) in FIG. 1.
Figure 4:
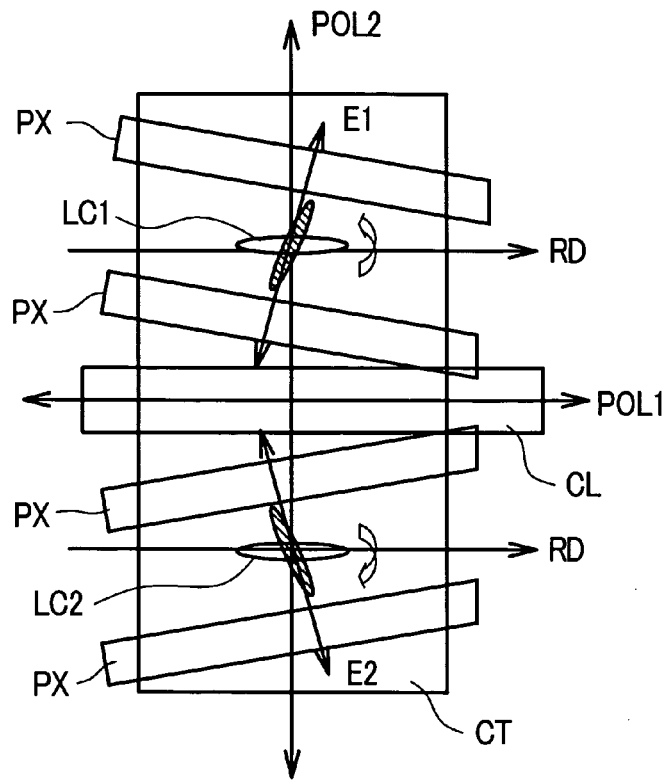
FIG. 4 is a diagram showing the polarization behavior of liquid crystal molecules in the first embodiment.
Figure 5:
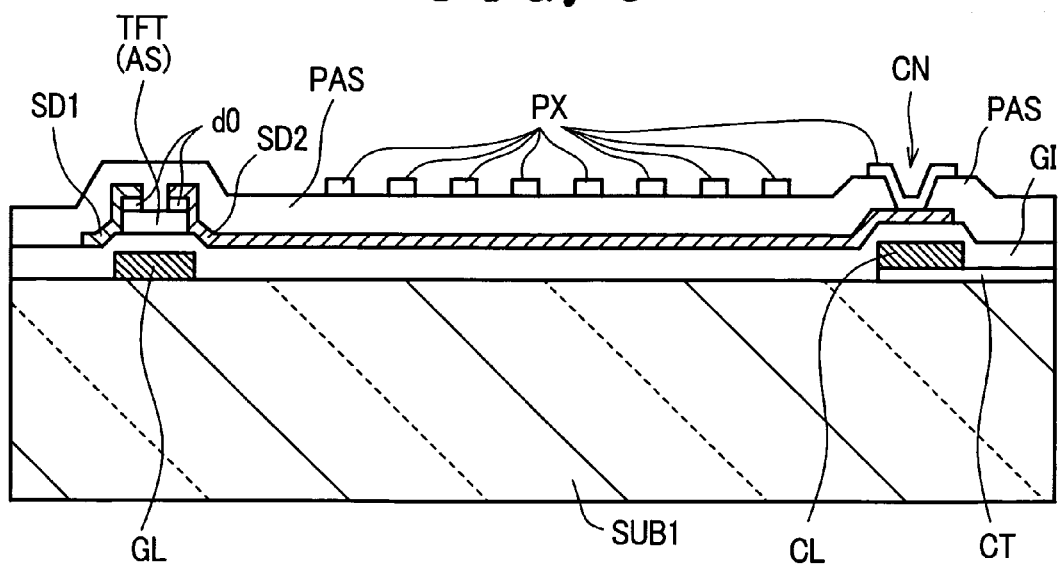
FIG. 5 is a cross-sectional view taken along a line II(a)-II(b) in FIG. 1.
Figure 6:
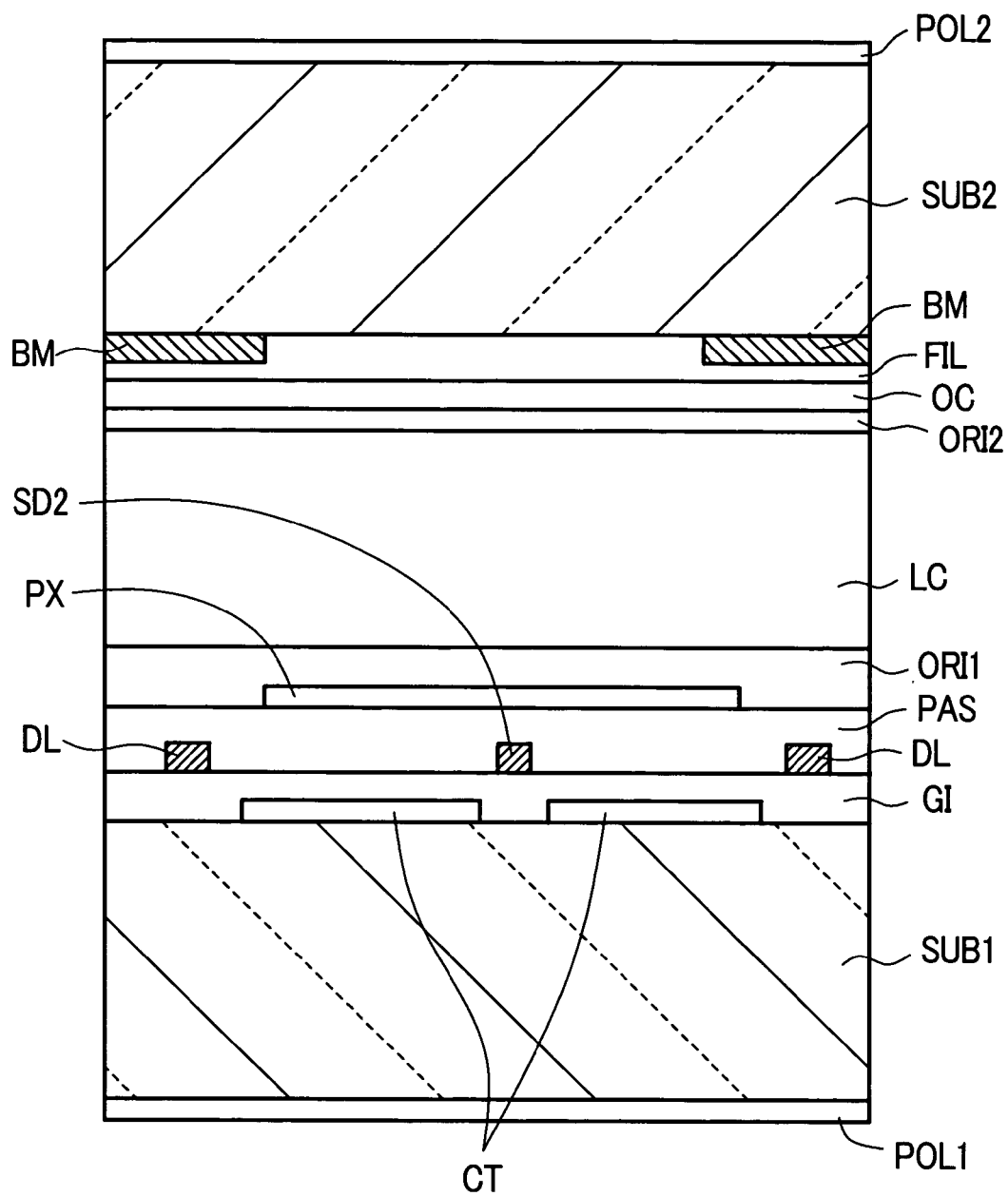
FIG. 6 is a cross-sectional view taken along a line III(a)-III(b) in FIG. 1.
Figure 7:
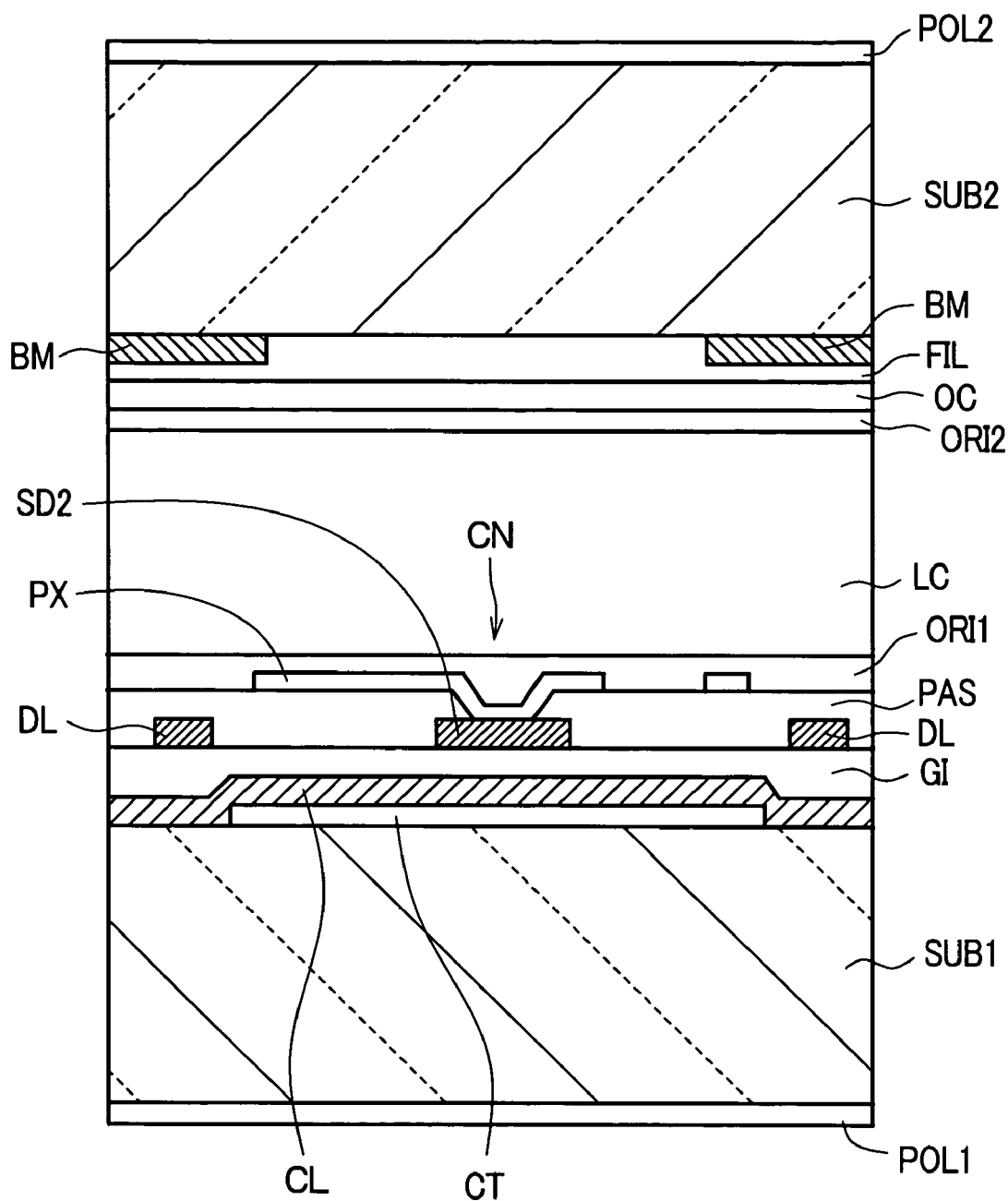
FIG. 7 is a cross-sectional view taken along a line IV(a)-IV(b) in FIG. 1.

FIG. 3 is a cross-sectional view taken along a line I(a)-I(b) in FIG. 1, FIG. 5 is a cross-sectional view taken along a line II(a)-II(b) in FIG. 1, FIG. 6 is a cross-sectional view taken along a line III(a)-III(b) in FIG. 1, and FIG. 7 is a cross-sectional view taken along a line IV(a)-IV(b) in FIG. 1. FIG. 4 is a plan view showing the operation of liquid crystal molecules at the time of turning the voltage applied to the liquid crystal molecules on or off in this liquid crystal mode.

First of all, in FIG. 1, the gate signal lines GL, which extend in the x direction and are arranged in parallel in the y direction in the drawing, are formed of a three-layered stacked film formed of molybdenum (Mo), aluminum (Al), molybdenum (Mo), which are stacked from the first transparent substrate side, for example. This gate signal line GL forms a rectangular region with the drain signal line DL, which will be explained later, and this region is configured to form the pixel region.

In this pixel region, the counter electrode CT is formed, which generates an electric field between the counter electrode CT and the pixel electrode PX to be described later. The counter electrode CT is formed to cover the whole area of the pixel region, except for a slight periphery of the pixel region, and it is made of ITO (Indium-Tin-Oxide), for example, which is a transparent conductor. Here, the counter electrode CT is partially notched, although this constitution will be explained later.

The counter electrode CT is connected with the counter voltage signal line CL, which is arranged parallel to the above-mentioned gate signal line GL in the vicinity of substantially the center of the neighboring gate signal line GL. The counter voltage signal line CL is integrally formed with the counter voltage signal lines CL, which are formed in the same manner in the counter electrodes CT in the left and right pixel regions as seen in the drawing (the respective pixel regions which are arranged along the gate signal lines GL).

The counter voltage signal line CL is formed of an opaque material in the form of a three-layered stacked film made of molybdenum (Mo), aluminum (Al) and molybdenum (Mo), for example.

Further, as mentioned above, by setting the material of the counter voltage signal line CL equal to the material of the gate signal line GL, the counter voltage signal line CL and the gate signal line GL can be formed in the same step, and, hence, the increase of the manufacturing man-hours can be obviated.

Here, it is needless to say that the above-mentioned counter voltage signal line CL is not limited to the above-mentioned three-layered film, and it may be formed of a single-layered film made of Cr, Ti, Mo, for example, or a two-layered film or a three-layered film made of these materials and a material which contains Al.

However, in this case, it is advantageous to position the counter voltage signal line CL above the counter electrode CT. This is because a selective etchant (for example, HBr) for the ITO film which constitutes the counter electrode CT can easily melt Al.

Further, it is advantageous to interpose a high-melting-point metal, such as Ti, Cr, Mo, Ta, W or the like, in at least a contact surface between the counter voltage signal line CL and the counter electrode CT. This is because ITO, which constitutes the counter electrode CT, oxidizes Al in the counter voltage signal line CL and forms a high resistance layer.

Accordingly, as one embodiment, in forming the counter voltage signal line CL made of Al or a material containing Al, it is preferable to adopt a multi-layered structure which uses the above-mentioned high melting point metal as the first layer.

Further, on an upper surface of the transparent substrate on which the counter electrode CT, the counter voltage signal line CL and the gate signal line GL are formed, an insulation film GI made of SiN, for example, is formed such that the insulation film GI covers the counter electrode CT, the counter voltage signal line CL and the gate signal line GL.

The insulation film GI functions as an interlayer insulation film of the counter voltage signal line CL and the gate signal line GL with respect to the drain signal line DL to be described later; it functions as a gate insulation film of the thin film transistor TFT to be described later in a region where the thin film transistor TFT is formed; and it functions as a dielectric film of the capacitive element Cstg to be described later in a region where the capacitive element Cstg is formed.

Then, the thin film transistor TFT is formed on a portion of the gate signal line GL (a left lower portion in the drawing) in an overlapped manner, and a semiconductor layer AS made of a-Si, for example, is formed on the insulation film GI of the portion.

By forming a drain electrode SD1 and a source electrode SD2 on an upper surface of the semiconductor AS, it is possible to form an MIS type transistor having an inversely staggered structure, which adopts a portion of the gate signal line GL as a gate electrode. Here, the drain electrode SD1 and the source electrode SD2 are simultaneously formed with the drain signal line DL.

That is, the drain signal lines DL, which extend in the y direction and are arranged in the x direction in FIG. 1, are formed, and portions of the drain signal lines DL are extended on the surface of the semiconductor layer AS of the thin film transistor TFT, thus forming the drain electrodes SD1 of the thin film transistors TFT.

Further, at the time of forming the drain signal lines DL, the source electrodes SD2 are formed, wherein these source electrodes SD2 are extended into the inside of the pixel regions so that contact holes CN, which are provided for connecting the pixel electrodes PX to be described later, are also integrally formed.

Here, as shown in FIG. 5, on an interface between the above-mentioned source electrode SD2 and the drain electrode SD1 of the semiconductor layer AS, a contact layer d0, which is doped with n-type impurities, for example, is formed.

The contact layer d0 is formed such that an n-type impurity doping layer is formed over the whole area of a surface of the semiconductor layer AS, the source electrode SD2 and the drain electrode SD1 are formed, and, thereafter, using these respective electrodes as masks, the n-type impurity doping layer, which is formed on a surface of the semiconductor layer AS that is exposed from the respective electrodes, is etched.

Then, on the surface of the transparent substrate SUB1 on which the thin film transistors TFT are formed in such a manner, a protective film PAS made of SiN, for example, is formed such that the protective film PAS also covers the thin film transistor TFT. The protective film PS is provided for preventing direct contact of the thin film transistor TFT with the liquid crystal LC.

Further, on an upper surface of the protective film PAS, the pixel electrodes PX are formed using a transparent conductive film made of ITO (Indium-Tin-Oxide), for example.

The pixel electrodes PX are formed in an overlapped manner on the region where the counter electrode CT is formed. The pixel electrodes PX extend at an equal interval while, respectively making an angle of approximately 10 degrees with respect to the x direction as seen in the drawing, and, at the same time, both ends of the pixel electrodes PX are connected with each other using the same material layers which extend in the y direction.

In this embodiment, an interval L between neighboring pixel electrodes PX is set to 3 to 10 μm, for example, while the width w of the pixel electrode PX is set to a value which falls within a range of 2 to 6 μm, for example.

In this case, the same material layers of the respective pixel electrodes PX at lower ends thereof are connected with contact portions of the source electrodes SD2 of the thin film transistors TFT through contact holes formed in the protective films PAS. On the other hand, the same material layer of the pixel electrodes PX1 at upper ends thereof is formed so as to be overlapped with the counter electrode CT.

By adopting such a constitution, on portions where the counter electrode CT and the respective pixel electrodes PX are overlapped relative to each other, a capacitive element Cstg, which consists of a stacked layer film constituted of the gate insulation film GI and the protective film PAS as a dielectric film, is formed.

The capacitive element Cstg is provided for storing the video signal in the pixel electrode PX for a relatively long time even when the thin film transistor TFT is turned off after the video signal from the drain signal line DL is applied to the pixel electrodes PX through the thin film transistor TFT.

Here, the capacitance of the capacitive element Cstg is proportional to the overlapped area of the counter electrode CT and the respective pixel electrodes PX, and the overlapped area is relatively increased. The dielectric film of the capacitance has a stacked layer structure formed of the insulation film GI and the protective film PAS.

It is needless to say that the material of the protective film PAS is not limited to SiN and may be formed of synthetic resin, for example. In this case, since the protective film PAS can be formed by coating, it is possible to obtain an advantageous effect in that the manufacture of the liquid crystal display device can be facilitated even when the film thickness of the protective film PAS is increased.

Further, on a surface of the transparent substrate SUB1 on which the pixel electrodes PX and the counter electrode CT are formed, an orientation film ORI1 is formed, such that the orientation film ORI1 also covers the pixel electrodes PX and the counter electrode CT. The orientation film ORI1 is a film which is directly brought into contact with the liquid crystal LC and is provided for determining the initial orientation direction of the liquid crystal LC.

In the above-mentioned embodiment, an explanation has been given of an example using ITO as the material of the transparent conductive film. However, it is needless to say even when IZO (Indium-Zinc-Oxide) is used as the material of the transparent conductive film, it is possible to obtain substantially the same advantageous effects.

The first transparent substrate SUB1, which has the above-mentioned constitution, is referred to as a TFT substrate, while the second transparent substrate SUB2, which is arranged to face the TFT substrate with liquid crystal LC disposed therebetween, is referred to as a filter substrate.

With respect to the filter substrate, as shown in FIG. 3 or FIG. 6 and FIG. 7, a black matrix BM is formed on a liquid-crystal-side surface of the filter substrate, such that respective pixel regions are defined; and, in opening portions of the black matrix BM which substantially determine the pixel regions, filters FIL are formed so as to cover the opening portions.

Then, an overcoat film OC formed of a resin film, for example, is formed to cover the black matrix BM and the filters FIL. An orientation film ORI2 is formed on an upper surface of the overcoat film.

The planar and cross-sectional constitutions of the embodiment 1 have been described. Next, the manner of operation of this liquid crystal mode will be explained in conjunction with FIG. 3 and FIG. 4. In this embodiment, as the liquid crystal, so-called positive-type nematic liquid crystal in which the long-axis direction of the liquid crystal, molecules is aligned with the electric field direction, is used. The turning on and off of the liquid crystal display exhibits a behavior which has normally-black voltage-transmissivity characteristics, in which the display state is a black state when no electric field is applied, and it is transformed into a white state when the voltage is applied.

FIG. 3 is a cross-sectional view taken along a two-dot chain line I(a)-I (b) shown in FIG. 1. The left hand side as viewed from the front in FIG. 3 is indicated by I(a) and the right hand side as viewed from the front in FIG. 3 is indicated by I(b). In this in-plane display mode (that is, a mode in which the pixel electrodes PX and the counter electrode CT are provided on the first transparent substrate SUB1 side), lines of electric force (E in FIG. 3) from the comb-teeth shaped pixel electrodes PX are applied to the inside of the liquid crystal LC, wherein the lines of electric force pass through the protective film PAS formed in gaps of the above-mentioned comb teeth and the gate insulation film GI through the inside of the liquid crystal LC and reaches the counter electrode CT, which is formed on the whole area of the pixel region in a substantially rectangular shape. In FIG. 3, the liquid crystal molecules LC1 in the left-hand-side (that is, the pixel region in FIG. 1 and the region below the counter voltage signal line CL which runs in the lateral direction), with respect to the center counter voltage signal line CL, are rotated in the clockwise direction with respect to the direction substantially parallel to the first substrate SUB1, while the liquid crystal molecules LC2 in the right-hand-side region, with respect to the center counter voltage signal line CL, are rotated in the counterclockwise direction with respect to the direction substantially parallel to the first substrate SUB1.

The manner of optical operation will be explained in conjunction with the plan view shown in FIG. 4. The counter voltage signal line CL is arranged on the center region of one pixel in the lateral direction. In the region above the counter voltage signal line CL, the comb-shaped pixel electrode PX is arranged to extend while having tilting orientation of approximately 10 degrees in the clockwise direction with respect to the counter voltage signal line CL; while, in the region below the counter voltage signal line CL, the pixel electrode PX is arranged to extend while having a tilting orientation of approximately 10 degrees in the counterclockwise direction with respect to the counter voltage signal line CL. Here, the so-called cross-nicol polarization of the polarization axis arrangement is adopted, wherein the polarization axis of the polarizer at the first substrate SUB1 side is arranged in a direction parallel to the extending direction of the counter voltage signal line CL, and the polarization axis of the polarizer at the second substrate SUB2 side is arranged in a direction perpendicular to the extending direction of the counter voltage signal line CL. The rubbing direction, which performs direction control of the liquid crystal molecules on interfaces of the orientation films (ORL1 and ORL2), is treated in parallel (in parallel to the extending directions of the counter voltage signal line CL and the gate signal line GL) with respect to both upper and lower substrate sides.

When the voltage applied to the liquid crystal is not present or is small, the long axes of the liquid crystal molecules LC1, LC2 are aligned with the extending direction of the counter voltage signal line CL. The pixel electrode PX in the upper region has a tilting orientation of 10 degrees in the clockwise direction. On the other hand, as shown in cross section in FIG. 3, the direction of lines of electric force E which start from the pixel electrode PX and reach the counter electrode CT through the liquid crystal is arranged perpendicular to the pixel electrode PX, that is, it makes an angle of 110 degrees in the clockwise direction with respect to the counter voltage signal line CL. The liquid crystal molecules LC1 follow this and are rotated in the electric field direction, that is, in the counterclockwise direction. Then, when the liquid crystal molecules LC1 have the long axis thereof rotated in a direction which is 45 degrees with respect to the polarization axis of the polarizer, the transmissivity assumes a maximum value. With respect to the liquid crystal molecules in the lower region, since the pixel electrode PX is arranged to have up-and-down symmetry with respect to the counter voltage signal line CL, the rotating direction becomes the opposite direction, that is, the counterclockwise direction. In this embodiment, the liquid crystal molecules in one pixel are divided into two regions for the clockwise rotation and the counterclockwise rotation, respectively, and, hence, it is possible to provide a display having a wide viewing angle in which the viewing angle of the screen is not inverted when viewed from any direction and the color change is small. Further, since the pixel electrode PX and the counter electrode CT are made of transparent ITO, and, at the same time, a sufficient electric field can be applied to the liquid crystal LC, it is possible to display a bright image by allowing the light to pass through substantially the whole area in the pixel region inside the black matrix BM.

Next, the feature of this embodiment, in which the embodiment has a pixel structure which enhances the numerical aperture or the transmissivity, and, at the same time, this embodiment provides a favorable image quality which hardly generates a point defect, will be explained in detail.

The largest cause of lowering the numerical aperture lies in the increase of the ratio that areas of the source electrodes SD2 and the drain electrodes SD1 occupy relative to the area occupied by the gate signal lines GL, the drain signal lines DL or the counter voltage signal lines CL, which are formed of opaque metal material. Particularly, as in the case of this embodiment, when it is necessary to connect the source electrodes SD2 formed on the gate insulation film GI and the pixel electrodes PX formed on the protective film PAS via the contact hole CN, the area of the source electrode SD2 in the vicinity of the contact hole CN is increased corresponding to the thickness of the protective film PAS, whereby the numerical aperture is lowered.

Further, besides the pattern design of the thin film transistors TFT, there may be a case in which the transmissivity is substantially lowered. The largest cause is a case in which the orientation film for controlling the interface of liquid crystal molecules is not favorably rubbed. Particularly, with respect to the contact hole CN having a large stepped portion, it is impossible to apply sufficient rubbing in the vicinity of the hole, and, hence, a region in which shade-like liquid crystal molecules are not controlled spreads in a region corresponding to the shade in the rubbing direction several times as large as an area of the contact hole CN. This phenomenon implies not only a simple lowering of the transmissivity, but also a disturbance of the control of the liquid crystal molecules, and, hence, an image in which the response speed is lowered appears. To eliminate the influence of this disturbance to at least the response speed, it is necessary to block the light using the opaque material, such as the black matrix BM and the lines on the first substrate SUB1. However, this may lower the numerical aperture.

The structure which can cope with such drawbacks will be explained in conjunction with drawings hereinafter. To obviate the lowering of the numerical aperture, by extending and arranging the source electrode SD2 of the contact hole CN over the counter voltage signal line CL, which constitutes the non-transmissive region from the thin film transistor TFT, in an overlapped manner, there is no possibility that the transmissivity loss will be newly increased. However, in this case, there arises a drawback in that the point defect failure is newly increased.

In the liquid crystal display mode of this embodiment, as mentioned previously, the transparent counter electrode CT is arranged in a rectangular shape in the inside of the pixel, the gate insulation film GI and the protective film PAS are stacked on the counter electrode CT, and the transparent pixel electrode PX is formed on the gate insulation film GI and the protective film PAS. The stacked area of both electrodes occupies 20 to 30% of one pixel region, and this 20 to 30% is a large value compared with other liquid crystal mode. When a pin hole or the like is present in the insulation film, short circuiting occurs, thus giving rise to a point defect on the screen. To minimize the occurrence of a point defect, this embodiment adopts a redundancy structure in which stacked film is formed of the gate insulation film GI and the protective film PAS, which are two insulation films formed in different steps, and, hence, even when a pin hole is present in one film, another film maintains the insulating property.

Here, as mentioned previously, to enhance the transmissivity, as shown in FIG. 7, the source electrode SD2 of the contact hole CN is formed on the counter voltage signal line CL. Accordingly, when the source electrode SD2 is simply extended from the drain electrode SD1 of the thin film transistor TFT, as shown in FIG. 1, the source electrode SD1 extends over the gate insulation film GI formed of a single layer on the counter electrode CT, and, hence, it is obvious that the redundancy against short circuiting is spoiled.

In this embodiment, first of all, as can be understood from the plan view shown in FIG. 1, a slit-like notch is formed in the counter electrode CT below the region to which the source electrode SD1 extends. Due to such a constitution, there is no possibility that short circuiting occurs between the lower counter electrode CT and the source electrode SD1. As can be understood from the cross-sectional structure shown in FIG. 5, the source electrode SD1 is, first of all, overlapped to a single-layer portion of the gate insulation film GI at a portion where the source electrode SD1 is overlapped to the counter voltage signal line CL. Due to such a constitution, even when the transmissivity is enhanced, it is possible to prevent the occurrence of a point defect whereby a favorable image quality can be obtained.

On the other hand, the pixel electrode PX, which is arranged on the protective film PAS such that the pixel electrode PX traverses the source electrode SD1, is overlapped with the protective film PAS of the single layer with a large overlapped area. However, since the same image potential is supplied to the pixel electrode PX and the source electrode SD1, even when short circuiting is generated physically, no point defect occurs. Accordingly, it is possible to provide a layout of the pixel electrodes PX on the counter electrode CT in the same manner as the upper region of the counter voltage signal line CL having no slits, as shown in FIG. 1. Accordingly, the lowering of the numerical aperture attributed to the provision of the slits can be suppressed. The slits of the counter electrode CT are set to have a slightly larger width than the source electrode SD1 formed with a minimum forming size, as shown in FIG. 6, by taking a misalignment in the photolithographic steps of the respective layers into consideration.

Further, the disturbance of the liquid crystal orientation attributed to the rubbing of the contact hole CN is also effectively suppressed, thereby to enhance the transmissivity. As explained in conjunction with FIG. 4, the rubbing direction is defined as being parallel to the gate signal line GL and the counter voltage signal line CL. Accordingly, the disturbance of liquid crystal molecules of the rubbing shade, which reaches a value several times as large as the diameter of the contact hole CN, is generated along the counter voltage signal line CL. As can be understood from the plan view shown in FIG. 1, the counter voltage signal line CL extends in the rubbing direction of the contact hole CN and seals a light source at the first transparent substrate SUB1 side.

Due to the above-mentioned structure of this embodiment, it is possible to provide a liquid crystal display device having a favorable image quality which exhibits high transmissivity, is bright and has the least point defects attributed to short circuiting of the pixel electrode PX and the counter electrode CT.

EMBODIMENT 2

Figure 9:
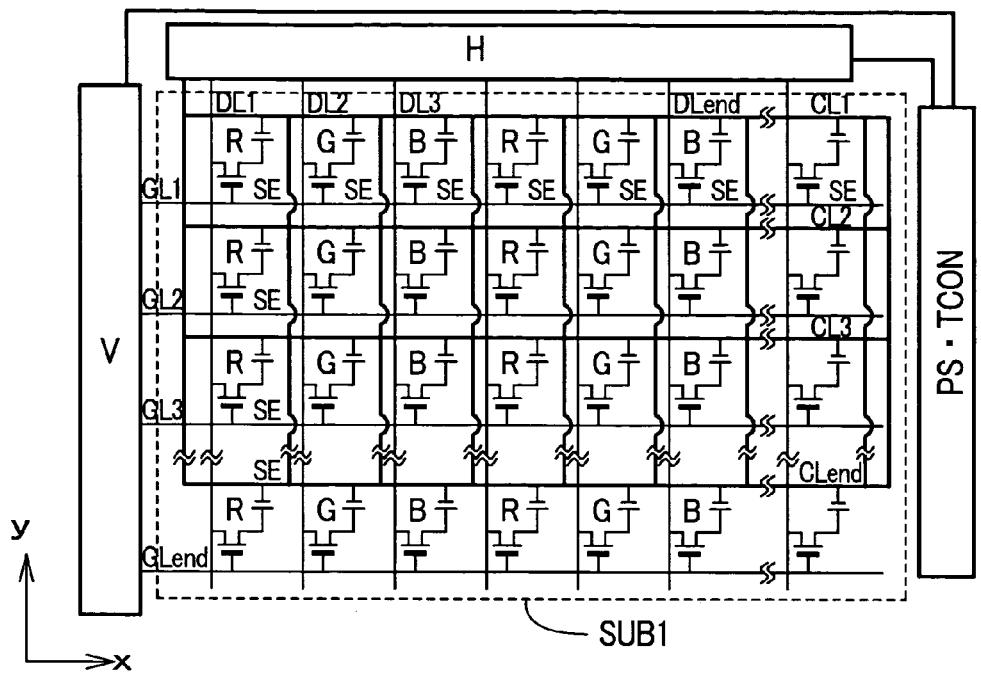
FIG. 9 is an equivalent circuit diagram showing another embodiment of the liquid crystal display device according to the present invention.

FIG. 9 is a view which shows an equivalent circuit of a liquid crystal display panel representing a second embodiment of the present invention, together with an externally mounted circuit of the liquid crystal display panel.

In FIG. 9, to respective gate signal lines GL, which extend in the x direction and are arranged in parallel in the y direction, a scanning signal (a voltage signal) is sequentially supplied by a vertical scanning circuit V.

A thin film transistor TFT of each one of the pixel regions, which are arranged along the gate signal lines GL, to which the scanning signal is supplied, is turned on in response to the scanning signal. Then, in conformity with this timing, a video signal is supplied to the respective drain signal lines DL from a video signal drive circuit H. The video signal is applied to respective pixel electrodes PX through the thin film transistors of the respective pixel regions.

In each pixel region, a counter voltage is applied to a counter electrode CT, which is formed together with the pixel electrode PX through a counter voltage signal line CL, and an electric field is generated between the respective electrodes. With respect to the pixel electrode PX and the counter electrode CT, at the timing at which an ON voltage is applied to the gate signal lines GL, the thin film transistor TFT is turned on, and the video information voltage from the drain signal line DL is applied to the pixel electrode PX, while the counter voltage signal is transmitted to the counter electrode CT in each pixel region through the counter voltage signal line CL, which is connected with the external power source, and, hence, the voltage is applied to the liquid crystal capacitance. The above-mentioned pixel electrodes PX and the counter electrodes CT are formed on a first transparent substrate SUB1 on which the thin film transistors TFT are formed. The pixel electrode PX and the counter electrode CT form a pixel capacitance, which represents a sum of a holding capacitive element Cstg, which is generated by sandwiching an insulation film between the pixel electrode PX and the counter electrode CT, and a liquid crystal capacitance Clc, which is generated by allowing an electric field between the pixel electrode PX and the counter electrode CT to pass through a liquid crystal portion. The liquid crystal mode of the present invention is characterized in that the area in which the counter electrode CT and the pixel electrode PX are stacked with an insulation film sandwiched therebetween is large, and, hence, the holding capacitance element Cstg of one pixel assumes a large value.

Then, among these electric fields, in response to an electric field having components parallel to the transparent substrate SUB1, the optical transmissivity of the liquid crystal LC is controlled.

In the above-mentioned constitution, one pixel region constitutes a region which is surrounded by neighboring drain signal lines DL and neighboring gate signal lines GL, and, as mentioned previously, the thin film transistor TFT, the pixel electrode PX and the counter electrode CT are formed on the region.

Figure 10:
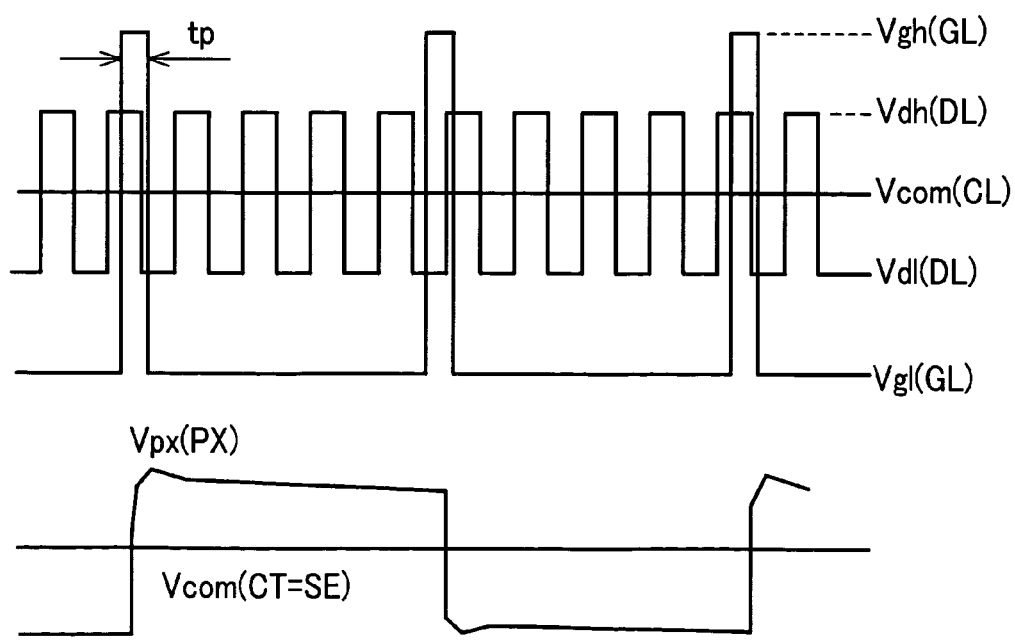
FIG. 10 is timing chart showing another embodiment in driving the liquid crystal display device according to the present invention.

FIG. 10 is a timing chart of respective signals supplied to the liquid crystal display panel. In the drawing, symbols Vgh, Vgl respectively indicate a high voltage level and a low voltage level of the scanning signal that are supplied to the gate signal line GL; symbols Vdh, Vdl indicate the maximum and the minimum voltage levels of the video signal that is supplied to the drain signal line DL; and symbol Vcom indicates a counter voltage signal that is supplied to the counter voltage signal line CL. The driving of the liquid crystal panel is effected by line sequential scanning in which, with respect to a screen scroll time for every one cycle, pulse-like drive voltages are applied for every gate signal line GL, and a video voltage is transmitted to all drain signal lines DL simultaneously. Accordingly, during a period in which one gate signal line GL is selected (turned on), the OFF voltage (Vgl) is applied to other gate signal lines GL. This scanning is performed in order, such as gate signal lines GL1, GL2, . . . . The gate selection time tp for one gate signal line GL becomes a time which is obtained by dividing the scroll time of one cycle with the total number of gate signal lines GL.

On the other hand, for one gate signal line GL, the thin film transistors TFT in series are turned on (period that the high voltage level Vgh is applied), and, hence, the potential of the pixel electrodes PX of each pixel is determined. The liquid crystal is turned on in response to the differential voltage between this potential and the potential Vcom of the counter electrode CT of another electrode, which is a sum of the capacitive element Cstg and the liquid crystal capacitance CLc which constitute capacitive elements. This differential potential is held until the gate signal line GL is turned on again.

On the other hand, the counter voltage signal line CL is formed on the first transparent substrate SUB1 as a line in extending the lateral direction, which is arranged in parallel to the gate signal line GL, and wherein the counter voltage signal lines CL are connected with each other using lines extending in the longitudinal direction, such that the lines are transverse to the gate signal lines GL, while sandwiching the insulation of the first substrate SUB1 with the gate signal line GL, thus forming mesh-like lines. Due to the mesh-like lines, even at a center region of the screen remote from an external power source, it is possible to remarkably reduce a phenomenon in which a large voltage amplitude of the gate signal line GL is caused to fluctuate by way of the parasitic capacitance within one pixel, which fluctuation makes the voltage of the counter voltage signal line CL unstable, thus giving rise to a defective display, such as image retention, flickering or the like, which are attributed to the application of a DC voltage to the liquid crystal. As a result, due to this mesh-like connection of lines, the resistance specification of the counter voltage signal line CL, which runs parallel to the gate signal line GL is alleviated, and, hence, the width of the counter voltage signal line CL on a layout can be narrowed, whereby the transmissivity can be enhanced. The gate signal line GL and the counter voltage signal line CL, which runs parallel to the gate signal line GL, are connected by a connection line SE, which is arranged on a protective film PAS by way of an insulation film with respect to the gate signal line GL. The line method of connection of the counter electrode CT and the counter voltage signal line CL within the above-mentioned one pixel will be explained in detail hereinafter.

Figure 8:
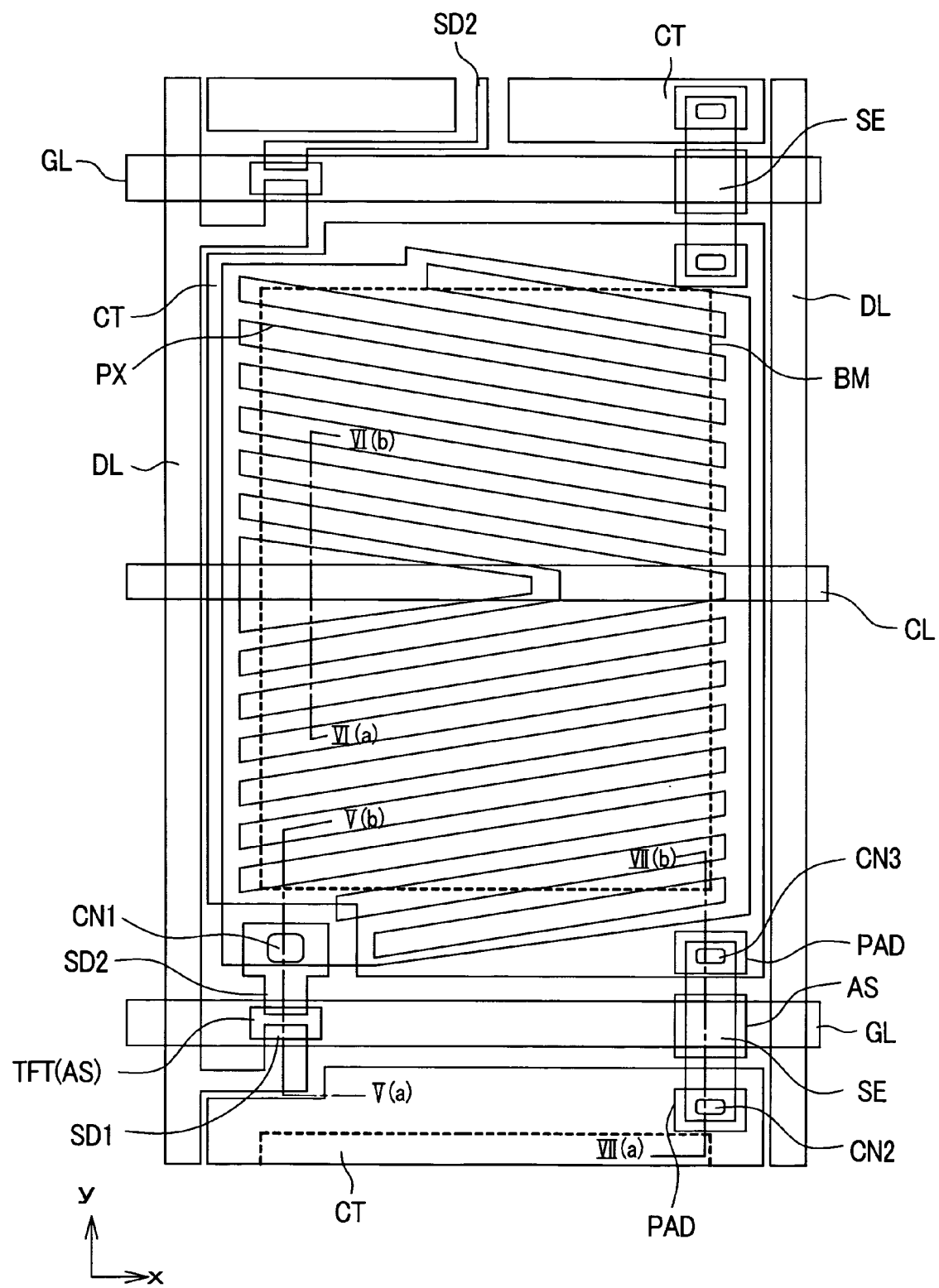
FIG. 8 is a plan view showing another embodiment of a pixel region of a liquid crystal display device according to the present invention.
Figure 11:
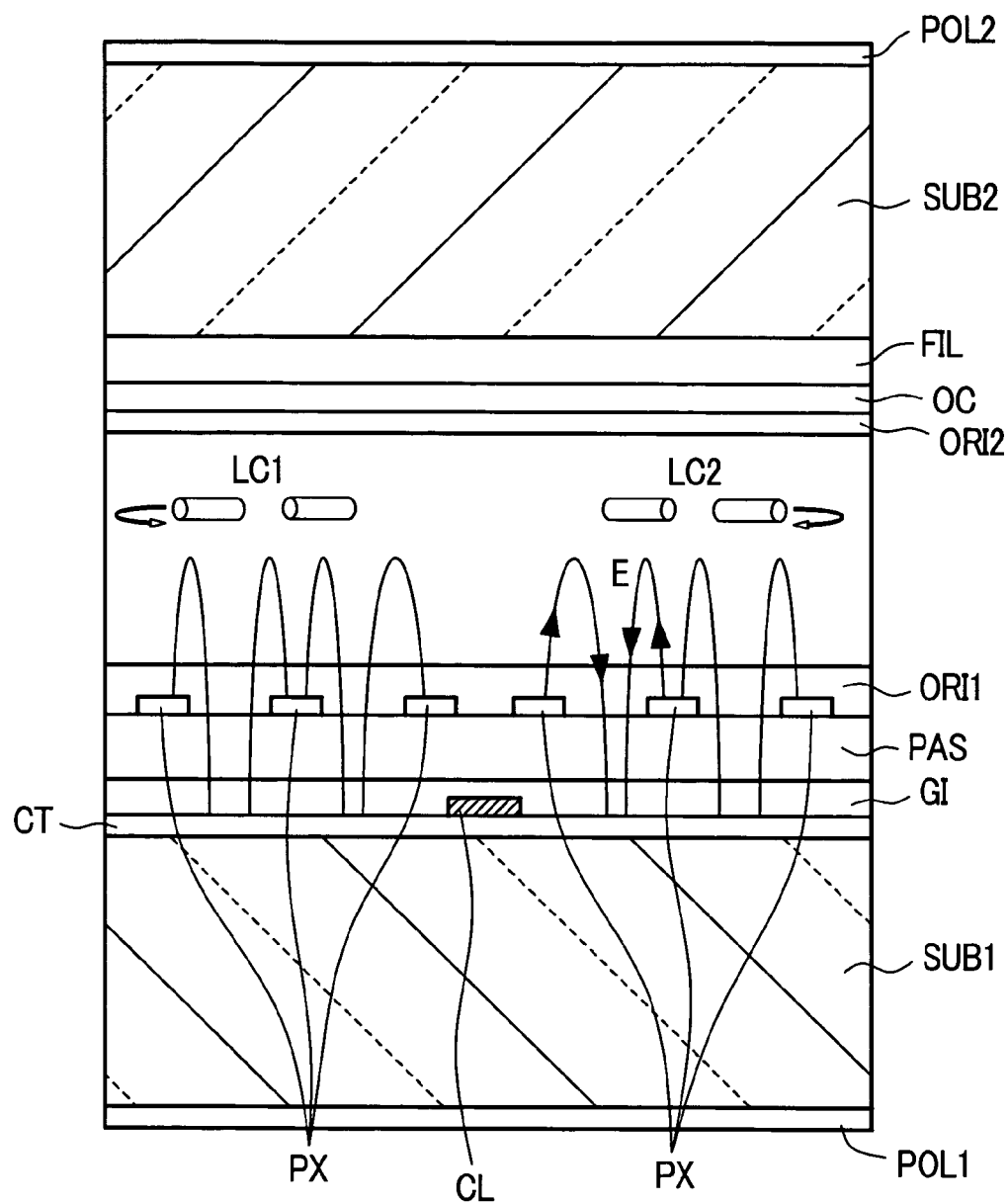
FIG. 11 is a cross-sectional view taken along a line V(a)-V(b) in FIG. 8.
Figure 12:
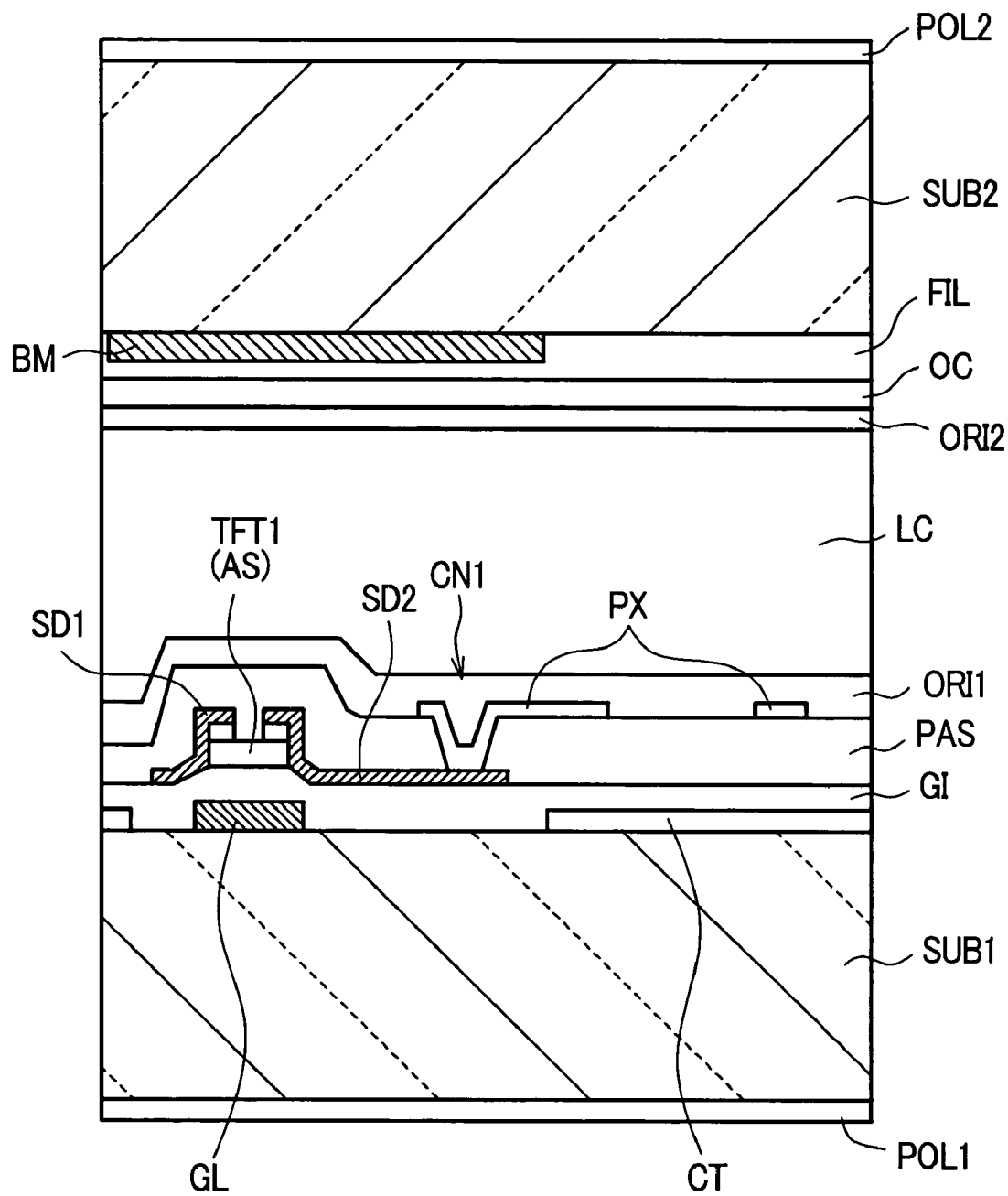
FIG. 12 is a cross-sectional view taken along a line VI(a)-VI(b) in FIG. 8.
Figure 13:
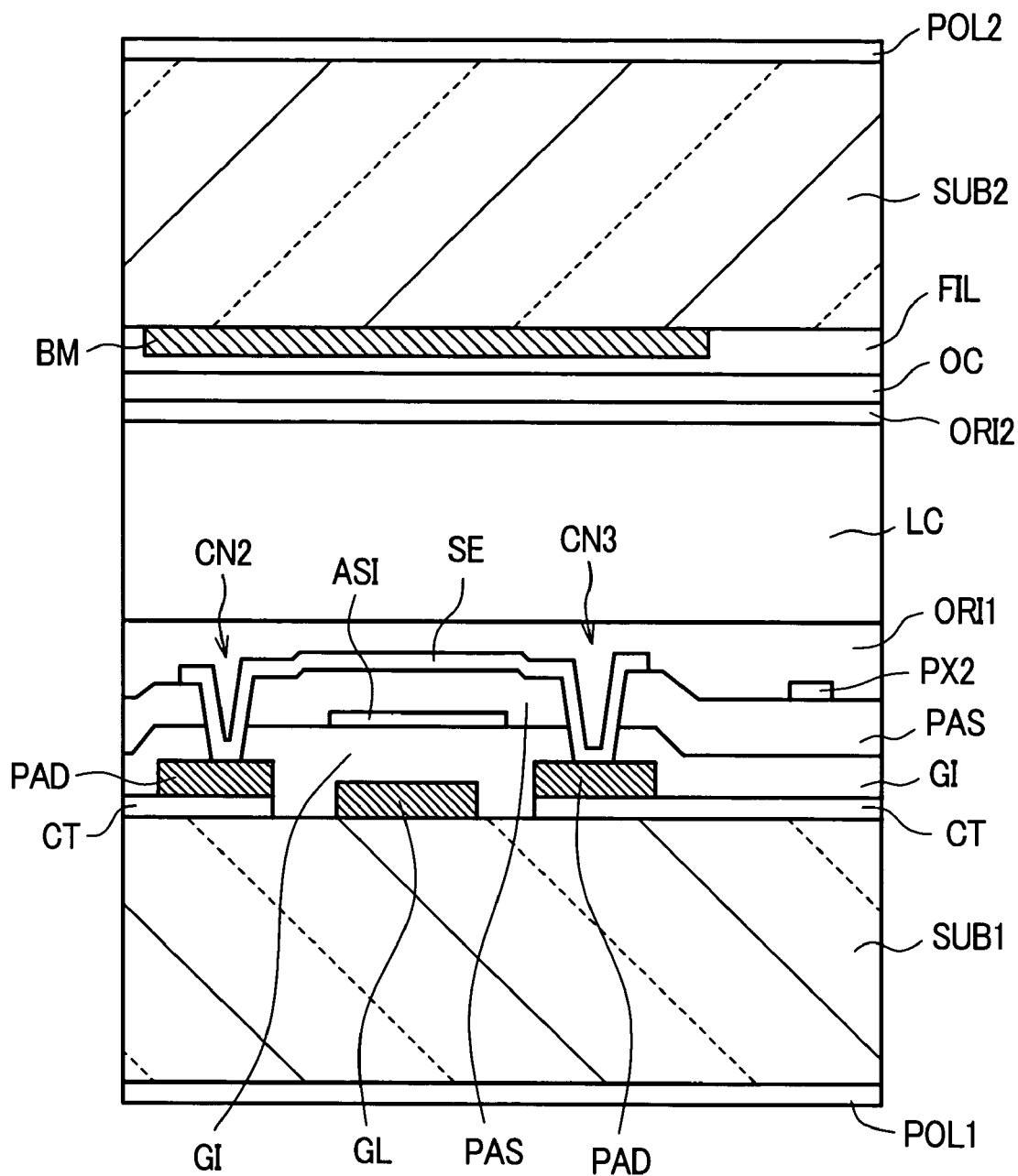
FIG. 13 is a cross-sectional view taken along a line VII(a)-VII(b) in FIG. 8.

FIG. 8 is a plan view showing another embodiment of the liquid crystal display device according to the present invention, while FIG. 11, FIG. 12 and FIG. 13 are, respectively, cross-sectional views taken along a line V(a)-V(a), a line VI(a)-VI(a) and a line VII(a)-VII(a) in FIG. 8.

The constitution shown in the plan view of FIG. 8, in addition to providing an enhancement of the transmissivity, which is the object of the present invention, provides a liquid crystal display device which exhibits a bright and favorable image quality with the least point defects attributed to short-circuiting of the pixel electrode PX and the counter electrode CT, which are formed with the insulation film sandwiched therebetween.

First of all, the source electrode SD2 disposed below the first contact hole CN1 is not overlapped to the counter electrode CT as seen in the plan view of FIG. 8. That is, the counter electrode CT has a notched shaped such that the counter electrode CT is not overlapped to the source electrode SD2, which is formed together with the drain signal line DL in the same step. The advantageous effect of this constitution can be understood in view of the cross-sectional structure shown in FIG. 12. The source electrode SD2, which is connected with the semiconductor layer AS of the thin film transistor TFT, basically extends over the semiconductor layer AS or the gate insulation film GI, which is contiguously formed with the semiconductor layer AS in the same step. The source electrode SD2 is connected with the pixel electrode made of ITO via the first contact hole CN1, which is formed in the protective film PAS. The source electrode SD2 is formed on the gate insulation film GI made of a single layer film or the gate insulation film GI which is continuously formed by a plasma chemical vapor deposition (PCVD) method using the same step as the gate insulation film GI made of a single layer film and the semiconductor layer AS. Below the source electrode SD2, the counter electrode made of ITO is not present, such that the counter electrode avoids the source electrode SD2, and, hence, a short-circuiting defect is not generated in principle even with use of an insulation film made of a single layer in which a pin hole is liable to be formed.

FIG. 11 shows the cross-sectional structure of a main transmitting portion of one pixel. On the transparent counter electrodes and the counter voltage signal line CL, which supplies electricity to the transparent counter electrodes along the gate signal line GL direction, which are formed on substantially the whole surface of the first transparent substrate SUB1, the gate insulation film GI and the protective film PAS, which are made of SiN, are stacked. Although the gate insulation film GI and the protective film PAS are formed by a PCVD method, the respective forming operations are performed in different steps, and, further, a step for cleaning foreign substances or the like is interposed between these steps. Accordingly, even if a pin hole is formed in one film, it is possible to provide a redundant constitution which can eliminate the possibility that a two-layered insulation film is short-circuited at the same portion. As illustrated in the cross-sectional structure of this embodiment, the pixel electrode PX and the counter electrode CT are insulated by a two-layered insulation film all over the inside of one pixel region, and, hence, there is no possibility that both electrodes will be short-circuited, thus generating a point defect. In this manner, according to this embodiment, all of the source electrodes SD2 and the pixel electrodes PX, to which pixel potentials are supplied from the thin film transistors TFT, the counter electrodes CT and the counter voltage signal line CL are insulated by a two-layered insulation film made of the gate insulation film GI and the protective film PAS, whereby it is possible to provide a liquid crystal display device having the least point defects, and which can minimize the occurrence of a short-circuiting defect of the regions which are overlapped, while sandwiching these insulation films therebetween.

Next, a mechanism to increase the transmissivity using this embodiment will be explained. In the plan view of one pixel, as shown in FIG. 8, an element which has a large non-transmitting area in the opening region formed inside the black matrix BM, is the counter voltage signal line CL. However, in this embodiment, the width of the counter voltage signal line CL in this embodiment 2 is set to one half or less of the width of the counter voltage signal line CL in this embodiment 1. When the width of the counter voltage signal line CL is narrowed, the wiring delay is increased and the DC voltage is applied to the liquid crystal, and, hence, image retention and flickering arise, thus deteriorating the image quality.

In this embodiment, by connecting the neighboring counter electrodes CT in the vertical direction using the connection lines SE at the right lower side and the right upper side, as seen in the plan view shown in FIG. 8, even when the width of the counter voltage signal line CL is narrow and, hence, the resistance is high, it is possible to prevent deterioration of the image quality. First of all, the structure of the connection lines SE will be explained, and, further, the manner of operation of the connection lines SE, which leads to an enhancement of the transmissivity, will be explained.

The connection lines SE are provided for connecting the upper and lower counter electrodes CT. As can be understood from the cross-sectional structure shown in FIG. 13, the contact holes CN2, CN3 are formed in the gate insulation film GI and the protective film PAS is formed on the counter electrodes CT, which are arranged in a rectangular shape in the inside of one pixel, such that the counter electrodes CT sandwich the gate signal line GL, and these counter electrodes CT are connected with each other using the connection line SE, which is made of ITO and is formed together with the pixel electrodes PX in the same step.

Below the contact holes CN, pad regions PAD are formed together with the gate signal lines GL in the same step, and these pad regions PAD have areas larger than the areas of the second contact hole CN2 and the third contact hole CN3. Accordingly, the gate signal lines GL and the counter voltage signal lines CL, which run in parallel to the gate signal lines GL, are electrically connected with each other by the repeated constitution formed of the counter electrode CT, the pad regions PAD and the connection lines SE.

Along with the formation of the above-mentioned connection lines SE, the transmissivity can be enhanced eventually. As shown in FIG. 10, the gate signal lines GL are scanned sequentially one after another. When the ON voltage is supplied to the gate signal line GL, the thin film transistor TFT is turned on and the video voltage is applied to the pixel electrode PX. On the other hand, at a moment at which the gate signal line GL is turned off, due to the coupling effect of a floating capacitance between the gate signal line GL and the pixel electrode PX, the pixel potential is lowered unintentionally. Simultaneously, the potential of the counter voltage signal line CL will also fluctuate, and, eventually, the voltage applied to the liquid crystal is distorted corresponding to the wiring distance from the power source, thus adversely influencing the image quality. To cope with this phenomenon, the width of the counter voltage signal line CL is increased so as to decrease the delay. In this case, however, the numerical aperture is lowered. In this embodiment, as shown in FIG. 8, in the inside of the black matrix BM of one pixel, the rectangular counter electrode CT made of ITO, having an area which approximates the area of one pixel, is formed. This area is an area large enough to shield all opening portions of the first substrate SUB1. Accordingly, although the counter electrode CT exhibits a high intrinsic resistance, since the counter electrode CT is made of ITO, the counter electrode CT largely spreads in the extending direction of the counter voltage signal line CL, whereby it is possible to effectively reduce the resistance. Further, the counter electrodes CT, which shield the opening regions, are connected over the whole region of the display device using the connection lines SE, which bridge over the gate signal lines GL. Accordingly, at a point of time at which the one gate signal line GL is selected to assume an OFF state, even when the potential of the corresponding counter voltage signal line CL fluctuates, the counter voltage signal line CL is replenished with the charge through the connection line SE and readily becomes stable.

The above-mentioned advantageous effects attributed to the connection lines SE are conventionally drastically decreased by forming the counter voltage signal line CL, which runs parallel to the gate signal line GL, into a so-called flat line. The effect is further enhanced by the fact the counter electrode CT has an area large enough to shield the opening region. Eventually, since it is possible to set the width of the counter voltage signal line CL, which is made of an opaque material, to an extremely fine value, the transmissivity can be enhanced.

According to this embodiment, the influence of the shade of the stepped portion of the contact hole in the rubbing step can be lowered in the following manner, thus further enhancing the transmissivity.

That is, in this embodiment, in the same manner as the first embodiment, rubbing treatment is applied in the extending direction of the counter voltage signal line CL or the counter electrode CT.

As shown in FIG. 8, with respect to all of the contact holes CN1, CN2, CN3, a black matrix BM is formed in the rubbing direction. Further, opaque pads PAD are provided below the contact holes CN2, CN3 of the connection line SE, and both of the upper and lower substrates are shielded from light by these opaque pads PAD.

In other words, in the liquid crystal pixel structure in which the rectangular electrode CT and the pixel electrode PX are combined while sandwiching the insulation film therebetween, when the liquid crystal display device includes the connection lines SE, which are formed via the contact holes which bridge over the gate signal lines GL, the transmissivity can be enhanced provided that the rubbing direction is perpendicular to or makes an angle of 20 degrees or less with respect to the line which connects the neighboring connection lines SE.

Further, the contact holes CN2, CN3 of the connection lines SE are arranged in an inclined manner with an inclination angle of approximately 10 degrees in the clockwise direction or in the counterclockwise direction with respect to the extending direction of the gate signal lines GL (to be more specific, the direction of the polarization axis of the polarizer of the first substrate SUB1). The contact holes CN2, CN3 of the pixel electrodes PX are arranged in spaces which are defined at end portions of the rectangular counter electrode CT with such an angle and are provided for eliminating factors which lower the transmissivity.

To describe the constitution of the invention disclosed in this specification in other words, for example, in FIG. 1, there is disclosed a liquid crystal display device which includes a pair of substrates which are arranged to face each other with liquid crystal disposed therebetween. The plurality of pixel regions which are formed on the liquid-crystal-side surface of the substrate, the pixel electrode which is formed in each pixel region and to which the video signal is supplied through the switching element driven in response to the signal from the gate signal line, and the counter electrode which is formed in each pixel region, is connected with the counter voltage signal line and generates an electric field between the pixel electrode and the counter electrode, wherein the counter electrode is formed over the substantially the whole area of the pixel region, the wiring layer which connects the switching element and the pixel electrode, and it extends into the region where the counter electrode is formed. The pixel electrode is formed on the upper surface of the second insulation film which is formed such that the second insulation film also covers the switching element and the wiring layer, and strip-like electrodes or slits are formed in parallel in a direction which intersects the extending direction of the strip-like electrodes or slits. The connection between the wiring layer and the pixel electrode is provided through the through hole formed in the second insulation film, and the slits which obviate the counter electrode from being overlapped to the wiring layer are formed in the counter electrode.

Further, for example, in FIG. 1, there is further disclosed a constitution in which the counter voltage signal line is arranged to traverse the pixel region, and the through hole which connects the wiring layer and the pixel electrode is positioned above the counter voltage signal line.

Further, for example, in FIG. 1 and FIG. 4, there is further disclosed a constitution in which the initial orientation direction of the liquid crystal is arranged parallel to the gate signal line.

Further, for example, in FIG. 1 and FIG. 4, there is further disclosed a constitution in which the initial orientation direction of the liquid crystal is arranged to be parallel to the counter voltage signal line.

Further, for example, in FIG. 1, there is disclosed a liquid crystal display device which includes a pair of substrates which face each other with the liquid crystal layer disposed therebetween. The plurality of pixel regions are formed on one substrate, the planar counter electrode is formed on each pixel region, and a comb-shaped or slit-shaped pixel electrode is formed on each pixel region. The comb-shaped or slit-shaped pixel electrode is formed over the counter electrode by way of the insulation layer, wherein a notch or the slit is formed in the counter electrode, such that the wiring layer made of the opaque material which transmits the potential to the pixel electrode from the thin film transistor, defines the region where the wiring layer is not overlapped to the counter electrode.

Further, for example, in FIG. 1, there is disclosed a liquid crystal display device which includes a pair of substrates which face each other with the liquid crystal layer disposed therebetween. The plurality of pixel regions are formed on one substrate, the planar counter electrode is formed on each pixel region, and the comb-shaped or slit-shaped pixel electrode which is formed on each pixel region. The comb-shaped or slit-shaped pixel electrode is formed over the counter electrode by way of an insulation layer, wherein the planar counter electrode has a removal region at a portion thereof, and the removal region extends in a direction different from the extending direction of the comb teeth or the slits of the pixel electrode.

Further, for example, in FIG. 1, there is further disclosed a constitution in which the removal region extends in a direction parallel to a long side of the counter electrode.

Further, for example, in FIG. 1, there is further disclosed a constitution in which a wiring layer, which is different from both of the counter electrode and the pixel electrode, is arranged in the removal region.

Further, for example, in FIG. 1, there is further disclosed a constitution in which the wiring layer, which is different from both of the counter electrode and the pixel electrode, is arranged in the removal region.

Further, for example, in FIG. 1, there is further disclosed a constitution in which the wiring layer and the pixel electrode are connected with each other via a through hole formed in an insulation film which covers the wiring layer.

Further, for example, in FIG. 1 and FIG. 4, there is further disclosed a constitution in which the initial orientation direction of the liquid crystal is parallel to a short-side direction of the counter electrode.

What is claimed is:

1. A liquid crystal display device comprising:
    a pair of substrates which are arranged to face each other with liquid crystal therebetween;
    a plurality of pixel regions which are formed on a liquid-crystal-side surface of the substrate;
    a pixel electrode which is formed in each pixel region and to which a video signal is supplied through a switching element driven in response to a signal from a gate signal line; and
    a counter electrode which is formed in each pixel region, is connected with a counter voltage signal line and generates an electric field between the pixel electrode and the counter electrode, wherein
    the counter electrode is planer-like shape in the pixel region,
    a wiring layer which connects the switching element and the pixel electrode and extends into the region where the counter electrode is formed,
    the pixel electrode is formed on an upper surface of a insulation film which is formed such that the insulation film also covers the switching element and the wiring layer, and strip-like electrodes or slits are formed in parallel in the direction which intersects the extending direction of the strip-like electrodes or slits, and the connection between the wiring layer and the pixel electrode is performed through a through hole formed in the second insulation film and the slits which obviate the counter electrode from being overlapped to the wiring layer are formed in the counter electrode.

2. A liquid crystal display device according to claim 1, wherein the counter voltage signal line is arranged to traverse the pixel region, and a through hole which connects the wiring layer and the pixel electrode is positioned above the counter voltage signal line.

3. A liquid crystal display device according to claim 1, wherein the initial orientation direction of the liquid crystal is arranged parallel to the gate signal line.

4. A liquid crystal display device according to claim 2, wherein the initial orientation direction of the liquid crystal is arranged parallel to the counter voltage signal line.

5. A liquid crystal display device according to claim 3, wherein the extending direction of the strip-like electrodes or slits in the pixel electrode make an angle of 3 to 20 degrees with respect to the gate signal line in the clockwise direction or an angle of 3 to 20 degrees with respect to the gate signal line in the counter clockwise direction.

6. A liquid crystal display device comprising:
a pair of substrates which face each other with a liquid crystal layer therebetween;
a plurality of pixel regions which are formed on one substrate;
a planar counter electrode which is formed on each pixel region; and
a comb-shaped or slit-shaped pixel electrode which is formed on each pixel region, the comb-shaped or slit-shaped pixel electrode being formed over the counter electrode by way of an insulation layer, wherein
a notch or a slit is formed in the counter electrode such that a wiring layer made of an opaque material which transmits a potential to the pixel electrode from a thin film transistor defines a region where the wiring layer is not overlapped to the counter electrode.

7. A liquid crystal display device according to claim 6, wherein the counter electrode is a transparent electrode.

8. A liquid crystal display device according to claim 7, wherein the pixel electrode is a transparent electrode.

9. A liquid crystal display device according to claim 8, wherein the wiring layer and the pixel electrode are connected with each other via a through hole formed in the insulation film which covers the wiring layer.

10. A liquid crystal display device according to claim 9, wherein the liquid crystal display device includes a counter voltage signal line which is connected with the counter electrode, the counter voltage signal line is arranged to traverse the pixel region, and a through hole which connects the wiring layer and the pixel electrode is positioned above the counter voltage signal line.

11. A liquid crystal display device according to claim 6, wherein the initial orientation direction of the liquid crystal is parallel to the gate signal line.

12. A liquid crystal display device according to claim 10, wherein the initial orientation direction of the liquid crystal is parallel to the counter voltage signal line.

13. A liquid crystal display device comprising:
a pair of substrates which face each other with a liquid crystal layer therebetween;
a plurality of pixel regions which are formed on one substrate;
a planar counter electrode which is formed on each pixel region; and
a comb-shaped or slit-shaped pixel electrode which is formed on each pixel region, the comb-shaped or slit-shaped pixel electrode being formed over the counter electrode by way of an insulation layer, wherein
the planar counter electrode has a removal region at a portion thereof, and the removal region extends in the direction different from the extending direction of the comb teeth or the slits of the pixel electrode.

14. A liquid crystal display device according to claim 13, wherein the removal region extends in the direction parallel to a long side of the counter electrode.

15. A liquid crystal display device according to claim 13, wherein a wiring layer which is different from both of the counter electrode and the pixel electrode is arranged in the removal region.

16. A liquid crystal display device according to claim 14, wherein a wiring layer which is different from both of the counter electrode and the pixel electrode is arranged in the removal region.

17. A liquid crystal display device according to claim 16, wherein the counter electrode is formed of a transparent electrode.

18. A liquid crystal display device according to claim 17, wherein the pixel electrode is formed of a transparent electrode.

19. A liquid crystal display device according to claim 18, wherein the wiring layer and the pixel electrode are connected with each other via a through hole formed in an insulation film which covers the wiring layer.

20. A liquid crystal display device according to claim 19, wherein the initial orientation direction of the liquid crystal is parallel to a short-side direction of the counter electrode.

* * * * *